(12) United States Patent
Pan

(10) Patent No.: US 8,494,308 B2
(45) Date of Patent: Jul. 23, 2013

(54) IMAGE UPSCALING BASED UPON DIRECTIONAL INTERPOLATION

(75) Inventor: Hao Pan, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 306 days.

(21) Appl. No.: 13/045,338

(22) Filed: Mar. 10, 2011

(65) Prior Publication Data
US 2012/0230608 A1      Sep. 13, 2012

(51) Int. Cl.
*G06K 9/32*           (2006.01)
(52) U.S. Cl.
USPC ........................................................ 382/300
(58) Field of Classification Search
USPC ............. 345/606; 348/538, E13.065, E7.012; 358/525; 375/E7.188, E7.248, E7.25; 382/300; 386/271; 700/189, 252; 708/290, 313, 847
See application file for complete search history.

(56) References Cited

U.S. PATENT DOCUMENTS

| | | | |
|---|---|---|---|
| 5,666,164 A | 9/1997 | Kondo et al. | |
| 6,323,905 B1 | 11/2001 | Kondo et al. | |
| 6,434,280 B1 | 8/2002 | Peleg et al. | |
| 6,466,702 B1 | 10/2002 | Atkins et al. | |
| 6,766,067 B2 | 7/2004 | Freeman et al. | |
| 7,106,914 B2 | 9/2006 | Tipping et al. | |
| 7,215,831 B2 | 5/2007 | Altunbasak et al. | |
| 7,218,796 B2 | 5/2007 | Bishop et al. | |
| 7,239,428 B2 | 7/2007 | Solecki | |
| 7,433,545 B2 * | 10/2008 | Kita .............................. | 382/299 |
| 8,023,561 B1 | 9/2011 | Garrido et al. | |
| 2004/0160439 A1 | 8/2004 | Xavier | |
| 2005/0105830 A1 * | 5/2005 | Chung et al. ................... | 382/300 |
| 2006/0033936 A1 * | 2/2006 | Lee et al. ........................ | 358/1.2 |
| 2006/0290950 A1 | 12/2006 | Platt et al. | |
| 2008/0123998 A1 * | 5/2008 | Gomi et al. ................... | 382/300 |
| 2008/0291332 A1 | 11/2008 | Messing et al. | |

FOREIGN PATENT DOCUMENTS

| | | |
|---|---|---|
| JP | 05-233794 A | 9/1993 |
| JP | 2005-341337 A | 12/2005 |
| JP | 2010-039672 A | 2/2010 |

OTHER PUBLICATIONS

International Search Report, mailed Apr. 17, 2012, PCT International Patent App. No. PCT/JP2012/056488, filed Mar. 7, 2012, Sharp Kabushiki Kaisha, 6 pgs.
Freeman et al., "Example-Based Super-Resolution," Computer Graphics and Applications, IEEE, vol. 22, No. 2, Mar./Apr. 2002, pp. 56-65.
Van Ouwerkerk, "Image super-resolution survey," Image and Vision Computing, vol. 24, Issue 10, Oct. 1, 2006, pp. 1039-1052, ISSN 0262-8856, 10.1016/j.imavis.2006.02.026.

* cited by examiner

*Primary Examiner* — Gregory F Cunningham
(74) *Attorney, Agent, or Firm* — Chernoff Vilhauer McClung & Stenzel, LLP

(57) ABSTRACT

A method for interpolation includes receiving an input image having a plurality of pixels and estimating an edge direction proximate a first pixel of the input image using a first technique from a plurality of discrete potential directions. Interpolating pixels using a substantially arbitrary scaling factor proximate the first pixel based upon the estimated edge direction and interpolating pixels using substantially arbitrary scaling factor proximate the first pixel based upon another technique not based upon the estimated edge direction. The interpolated pixels are determined for an output image having more pixels than the input image based upon the interpolated pixels of step (c) and step (d).

16 Claims, 16 Drawing Sheets

FIG. 2 THE 12 ESTIMATED ANGLES DEFINED IN A 7X7 WINDOW

FIG. 3 ILLUSTRATION OF DIRECTIONAL INTERPOLATION. AN OUTPUT PIXEL USES ITS NEAREST INPUT PIXEL'S EDGE ORIENTATION AS ITS INTERPOLATION DIRECTION. ALL THE OUTPUT PIXELS IN THE SHADOW SQUARE SHARE THE SAME INTERPOLATION DIRECTION.

(2)

(5)

(11)

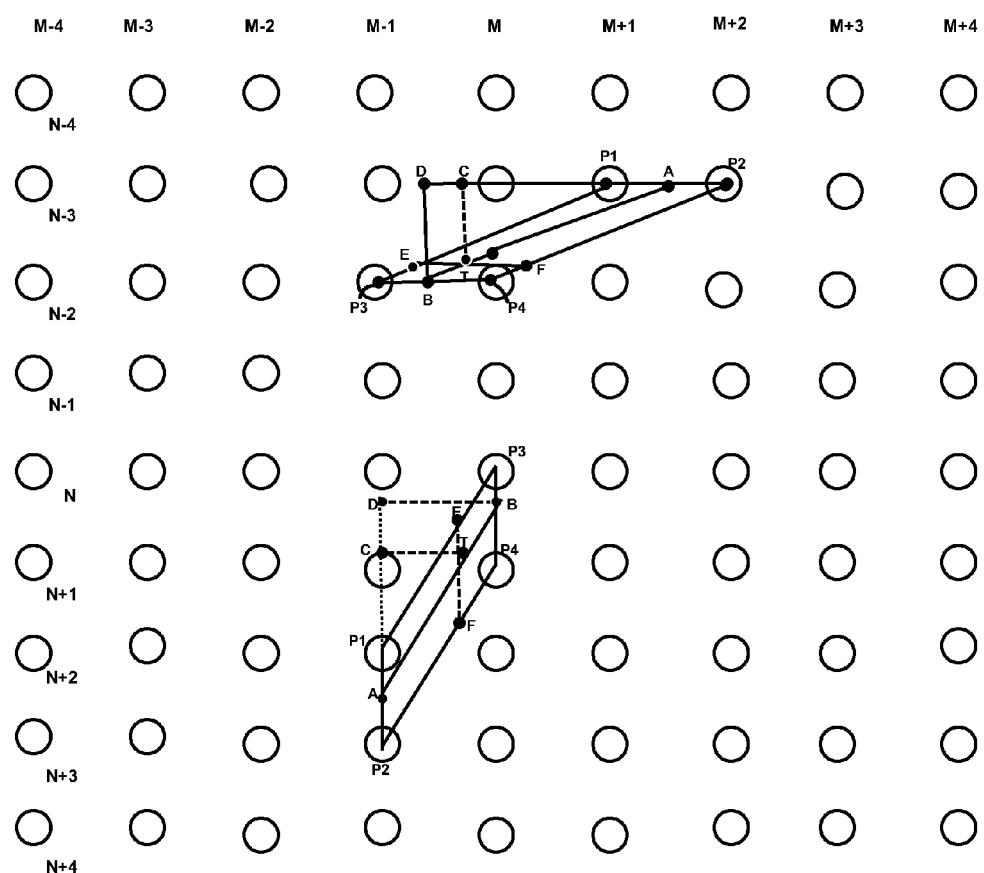
FIG. 16 ILLUSTRATION OF FINDING THE FOUR PIXELS THAT DEFINE THE X- AND Y-PARALLELOGRAMS.
THE X-PARALLELOGRAM IS AT THE TOP AND Y-PARALLELOGRAM IS AT THE BOTTOM.

IMAGE UPSCALING BASED UPON DIRECTIONAL INTERPOLATION

CROSS-REFERENCE TO RELATED APPLICATIONS

None

BACKGROUND OF THE INVENTION

The present invention relates to image upscaling based upon directional interpolation.

Digital video is typically represented as a series of images or frames, each of which contains an array of pixels. Each pixel includes information, such as intensity and/or color information. In many cases, each pixel is represented as a set of three colors, each of which is defined by eight bit color values.

Pixel information within a frame may be missing such as boundary conditions that may result when executing a video conversion process, such as the conversion between interlaced television field signals and progressive frame signals. In other cases, a frame may be at a first resolution, such as standard definition, which is desirable to convert to a second resolution, such as high definition.

Standard techniques for pixel interpolation are based on the application of classical linear filters. However, such techniques introduce various visual artifacts such as blurring of sharp edge patterns and detailed texture patterns in the image, ringing along edge contours, as well jaggedness along edge contours. Such artifacts generally cannot be avoided when standard linear filtering techniques are used for interpolation. Therefore, there is a need for improved techniques for pixel interpolation, such as techniques that are adaptive to local image patterns.

An improved technique for pixel interpolation is generally referred to as an edge-directed interpolation which seeks to generate a value for a missing pixel by extending the patterns in selected directions, expressed as edges which exist in the surrounding pixels of an image frame. Unfortunately, it is difficult to determine the existence of an edge in an image and the direction of such an edge in an image. Erroneous estimates of the direction can lead to new visual artifacts in the image after interpolation. Therefore, there is a need for a robust technique for estimating the direction of a local edge pattern in an image. Furthermore, there is a need for an image upscaling technique with low computational complexity that can outperform standard linear filtering techniques in terms of visual quality.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF TEE DRAWINGS

FIG. 16 illustrates an interpolation technique for finding four pixels of parallelograms.

DETAILED DESCRIPTION OF PREFERRED EMBODIMENT

Figure 1:
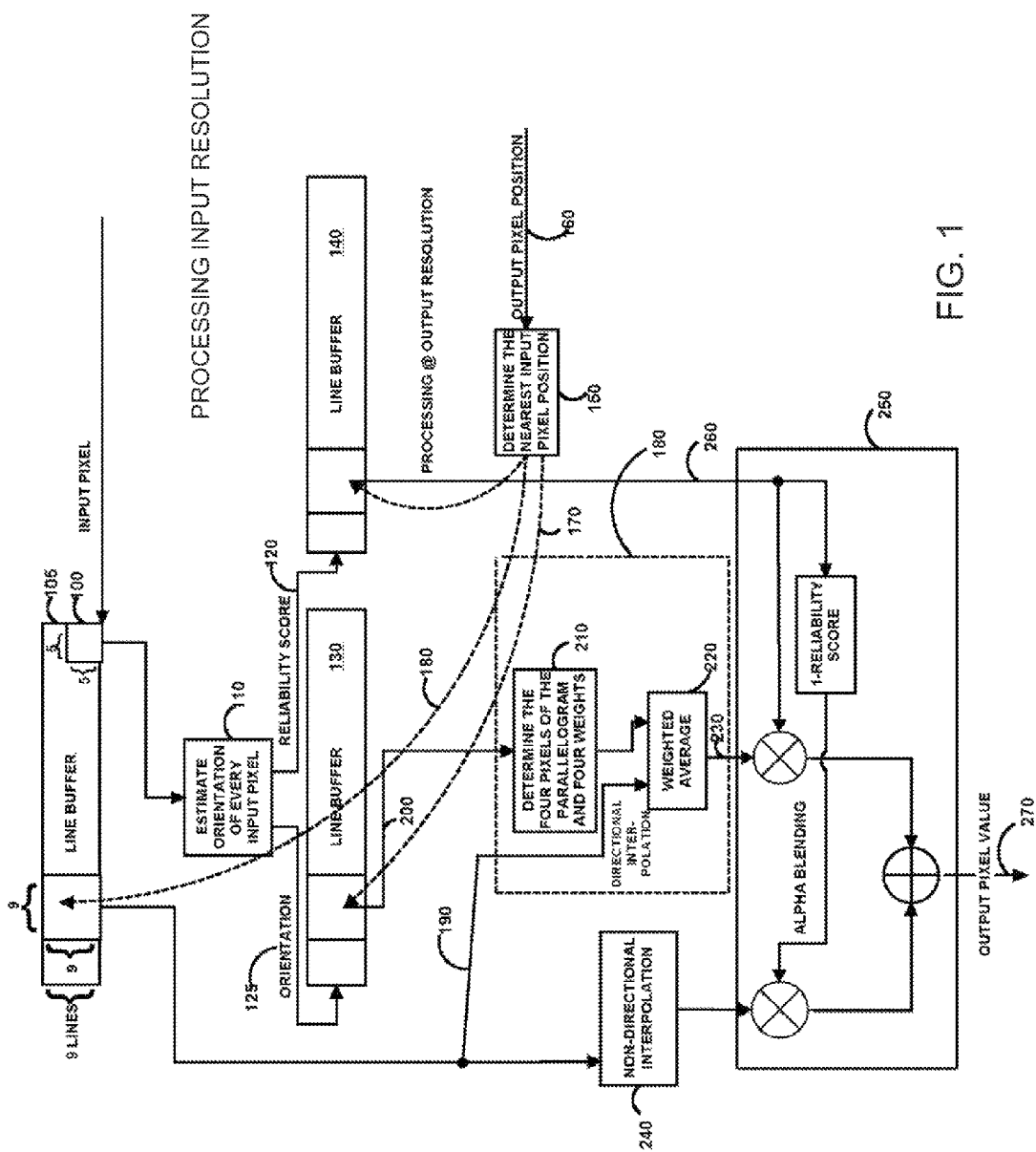
FIG. 1 is a block diagram of an image upscaling technique.

Referring to FIG. 1, an exemplary image upscaling technique includes directional based interpolation. The technique includes a window of image pixels 100 such as a 5 by 5 set of pixels (25 total pixels). Preferably the image upscaling technique is applied to each pixel of the image, with the 5 by 5 window of pixels being sequentially centered around each pixel of the image, such as in a raster scan fashion. The upscaling technique preferably estimates the edge orientation of the central pixel of the 5 by 5 window based upon the luminance Y component of the color image, even if no edge exists in the window. For example, Y can be calculated from RGB using the definition by CCIR709=0.2126R+0.7152G+0.0722B. The window of image pixels 100 is preferably moved around the image in a predefined manner such that the input image containing M×N pixels results in an output image greater than M×N pixels. The movement may be based on using a line buffer 105. It is noted that a larger or smaller window of pixels may alternatively be used. A preferred window is a square window of pixels. It is also noted that a window with other shapes may alternatively be used, such as a rectangular window, or a diamond shaped window, or octagonal shaped window, and so forth.

The 5 by 5 window may be used to estimate an orientation 110 (direction) of an edge at or near the central pixel. The orientation estimation 110 of the edges may use any suitable technique, such as using a gradient technique, to determine an orientation 125.

For example, the gradient estimation for a M×N block of pixels may be based upon:

$$\theta(M, N) = \tan^{-1}\left(\frac{G_y(M, N)}{G_x(M, N)}\right)$$

where $G_x^{(M,N)}$ and $G_y^{(M,N)}$ are the x- and y-gradients at $(M,N)$.

One technique to calculate the gradients is based upon a Sobel operator, namely:

$$G_x(M, N) = (p(M-1, N+1) + 2p(M, N+1) + p(M+1, N+1)) -$$
$$(p(M-1, N-1) + 2p(M, N-1) + p(M+1, N-1))$$
$$G_y(M, N) = (p(M+1, N-1) + 2p(M+1, N) + p(M+1, N+1)) -$$
$$(p(M-1, N-1) + 2p(M-1, N) + p(M-1, N+1))$$

where p(M−1,N−1) is pixel's intensity at (M−1,N−1), etc.

A reliability measure 120 may be determined which estimates the likelihood that the orientation estimation 110 has determined an actual edge. The reliability score may be based on checking the agreement between an estimated angle and its 8 neighbors in a 3×3 window, i.e., $$\text{reliability\_score} = \frac{1}{8}\left(\sum_{m=-1}^{1}\sum_{n=-1}^{1}(\theta(x-m, y-n) == \theta(x, y)) - 1\right)$$

The above equation illustrates that the reliability score may be a non-binary scaler between 0 and 1, with 8 quantization levels. Any other reliability measure may likewise be used.

Optionally, the output of the orientation estimation 110 may be refined by an orientation refinement technique. The orientation refinement may use a different technique from the orientation estimation 110 to select from among the best candidate(s) from the orientation estimation 110. The orientation refinement reduces the likelihood of the orientation estimation 110 being in error as a result of local minimums in the estimation process.

A set of orientations 125 for a group of pixels may be stored in a line buffer 130. In this manner, a plurality of orientations 125 will be available, as needed, for further image analysis without having to recalculate the orientations for a previously processed pixel. Likewise, a set of reliability measures 120 may be stored in a line buffer 140. In this manner, a plurality of reliability measures 120 will be available, as needed, for further image analysis without having to recalculate the orientations for a previously processed pixel.

A location determination process 150 may be used to determine, based upon the desired location of the output pixel position 160, the orientation 125 of which pixel 170 of the input image should be used to determine the value of the output pixel position 160. Preferably, the selected pixel 170 is the one closest to a pixel location in the input image. The location determination process 150 may further, based upon the desired location of the output pixel position 160, obtain a selected set of pixels 180 of the input image that may be used to determine the pixel value of the output pixel position 160. By using a technique that includes a flexible set of locations to select an orientation and the appropriate set of input image pixel values, a near continuous set of output positions may be selected, such as those that are not merely a multiple of 2.

A direction based interpolation technique 180 uses the pixel data 190 from the line buffer 105 together with the orientation of the selected pixel 200 from the line buffer 130 in combination with the output pixel position 160. Based upon the input information to the directional interpolation 180, a set multiple input image pixels 210 are selected from which to determine the value at the output pixel position 160. The set of multiple input pixels 210 is preferably 4 forming an enclosed loop, preferably in the shape of a parallelogram. In addition to selecting the set of multiple input pixels, the process further selects appropriate weights for the set of multiple input pixels 210 suitable to provide a value at the output pixel position 160. By using a larger set of pixel data 190, such as a 9×9 set of pixel data, the angular interpolation can be performed on a finer basis. By using a technique that includes a flexible set of locations used to select the value for the desired output pixel position, further based upon the orientation, a near continuous set of output positions may be selected, such as those that are not merely a multiple of 2.

The directional based interpolation technique 180 uses the pixel locations and the corresponding weights 210 together with the input pixel data 190 to determine an appropriate weighted average 220 for the desired output pixel position 160. The result of the directional based interpolation technique 180 is a value 230 for the output pixel position 160.

In some cases, the directional interpolation 180 does not provide accurate results, such as in the case that there is no defined edge within the 5 by 5 window or the pixel is near the edge of an image. The upscaling technique may provide a fallback interpolation 240 that is not based to such a degree upon the determination of edges. For those are not on the edge, non-directional interpolation approach is preferred. There are many such interpolation techniques, which may or may not be content adaptive. As one of the many embodiments, Lanczos linear filter may be used:

$$O_{NDI}(x,y) = \Sigma\Sigma(w_{i,j}P(\text{floor}(x)+i, \text{floor}(y)+j))$$

where P is the input pixel.

Thus every output pixel position 160 may be interpolated twice, namely, a directional technique 180 and a fallback technique 240. A blending mixes 250 together the two techniques based on the respective reliability_score 260:

$$O_{final}(x,y) = \text{reliability\_score} * O_{DI} + (1 - \text{reliability\_score}) * O_{NDI}$$

Using the reliability measure 260 as a basis for determining an appropriate output 270, the fallback interpolation 240 may be multiplied by 1 minus the reliability measure which is added to the directional interpolation multiplied by the reliability measure. In this manner, the output 270 is a combination of the directional interpolation and the fallback interpolation. This process is repeated for all the desired output pixel positions. The result of the technique is the ability of selecting any desired output image resolution, and being capable of scaling substantially any input image resolution to that desired output image resolution.

The implementation of the system may use any suitable technique. In one implementation, the rate at which the orientation estimation is performed may be at a slower rate than the interpolation technique which is performed at a higher rate. This difference in rates facilitates more efficient data throughput for the upscaling of the image.

Figure 2:
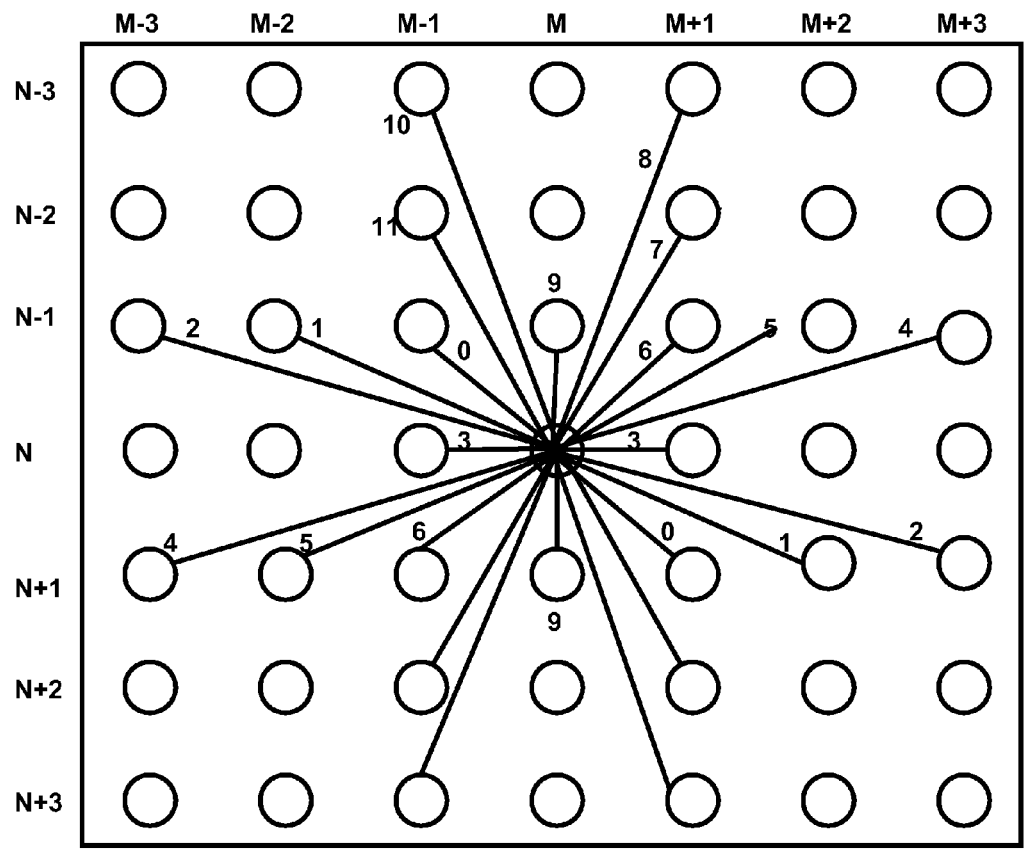
FIG. 2 illustrates a 7 by 7 window for the interpolation of pixels.

Referring to FIG. 2, the orientation estimation 110 by may use gradients to estimate one or more pixels around the center pixel. The technique may quantize the edge orientation into a plurality of different directions to make a determination of where the edge may exist, if any. The angles are preferably not evenly distributed to facilitate the construction of interpolation parallelograms so that the 4 corners of the parallelograms snap to the input pixel grids. The quantization may include coefficients (most of them are preferably zero) for performing the interpolation along the edge orientation, not across the edge orientation.

Figure 4:
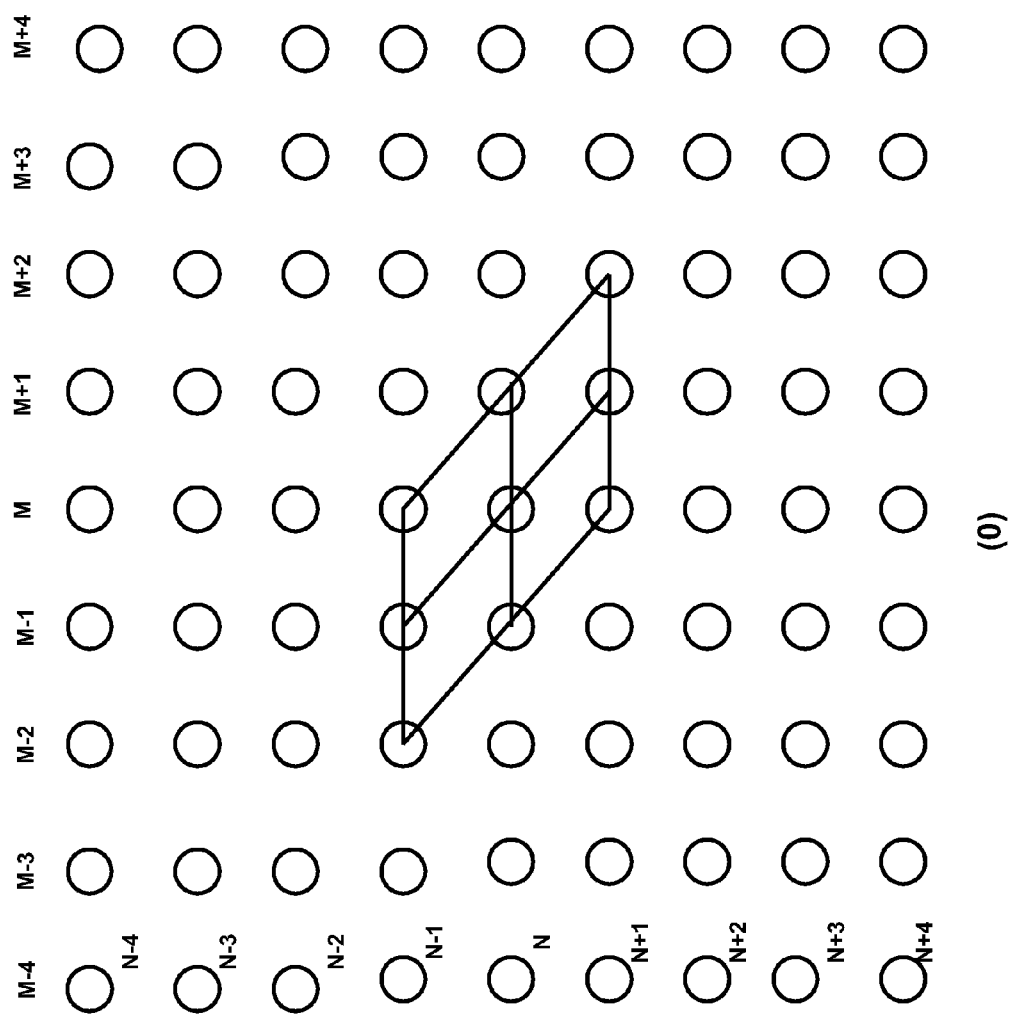
FIG. 4 illustrates an interpolation technique for −45 degrees.
Figure 5:
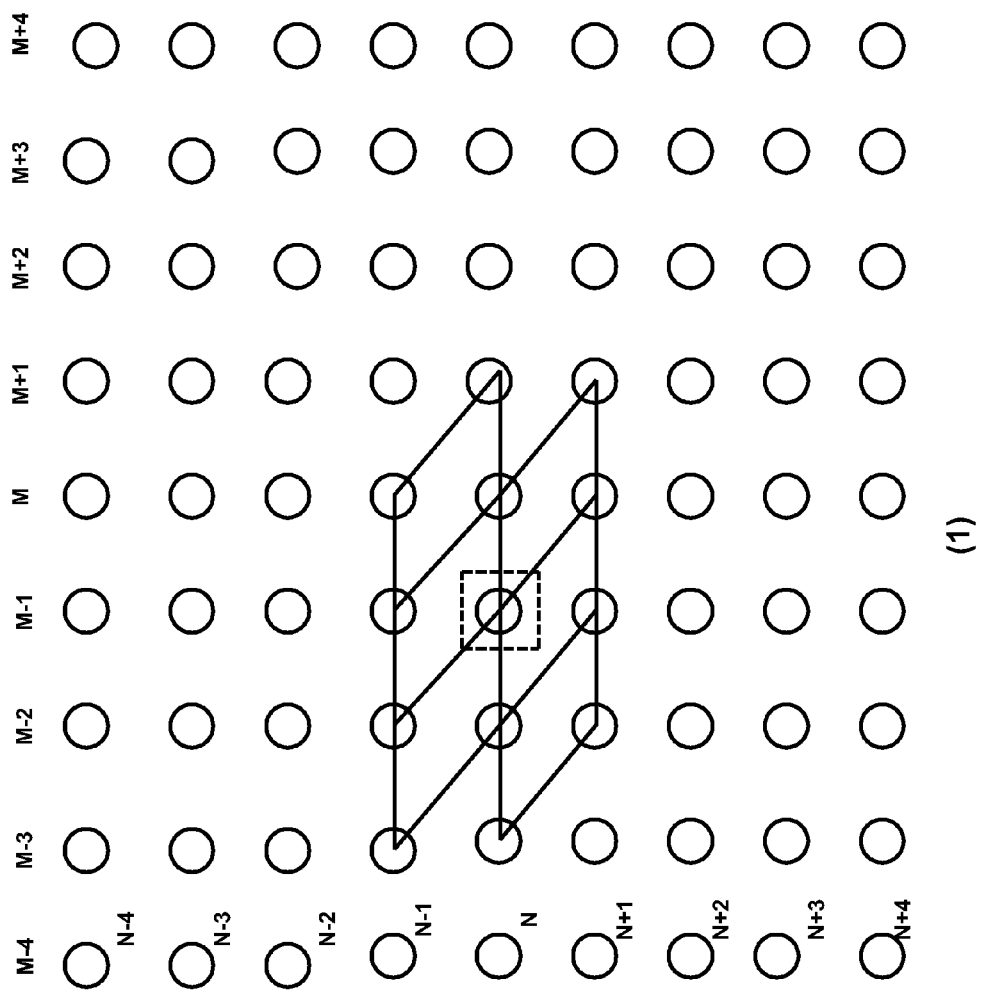
FIG. 5 illustrates an interpolation technique for −26.6 degrees.
Figure 6:
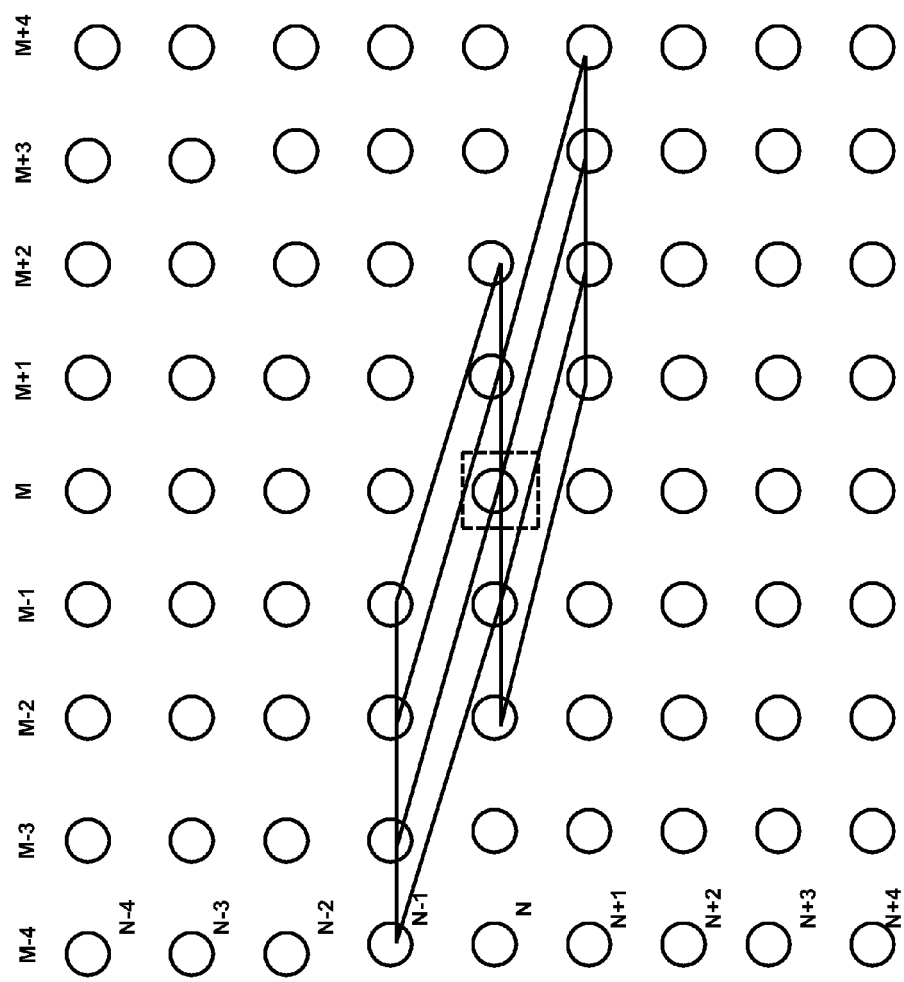
FIG. 6 illustrates an interpolation technique for −18.4 degrees.
Figure 7:
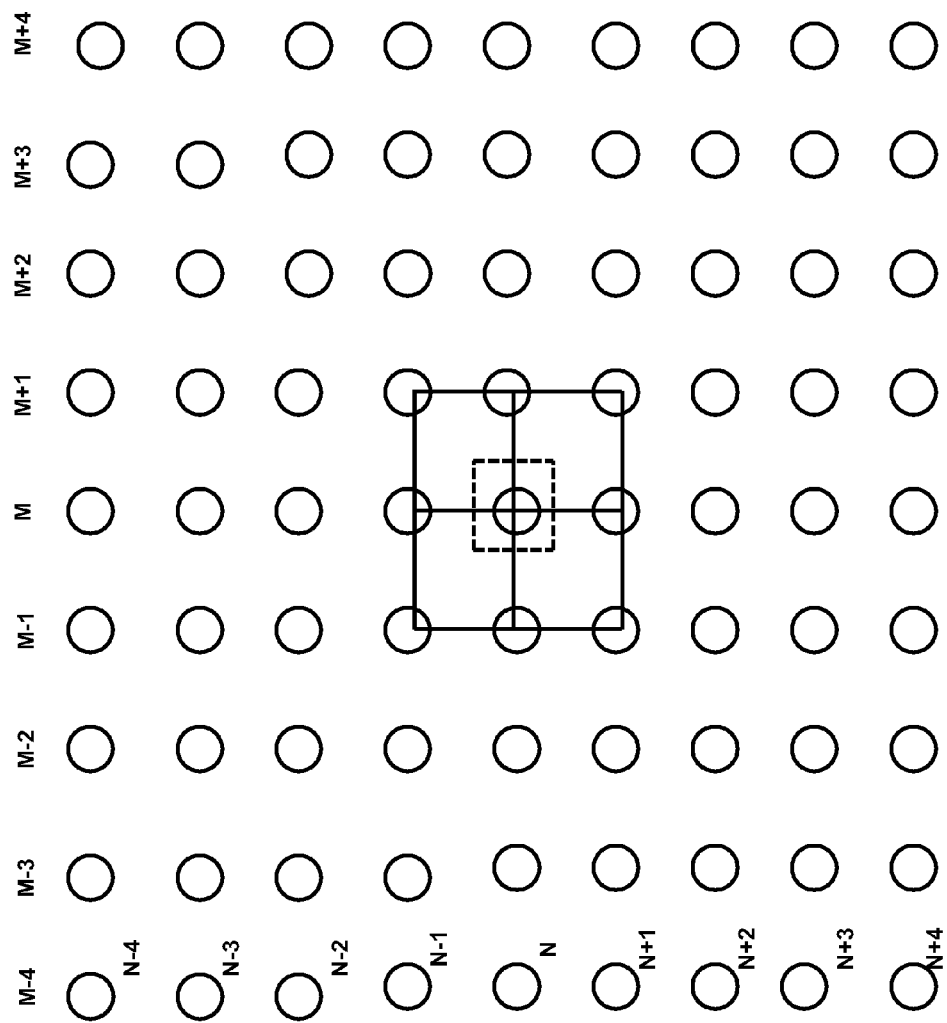
FIG. 7 illustrates an interpolation technique for +0 degrees.
Figure 8:
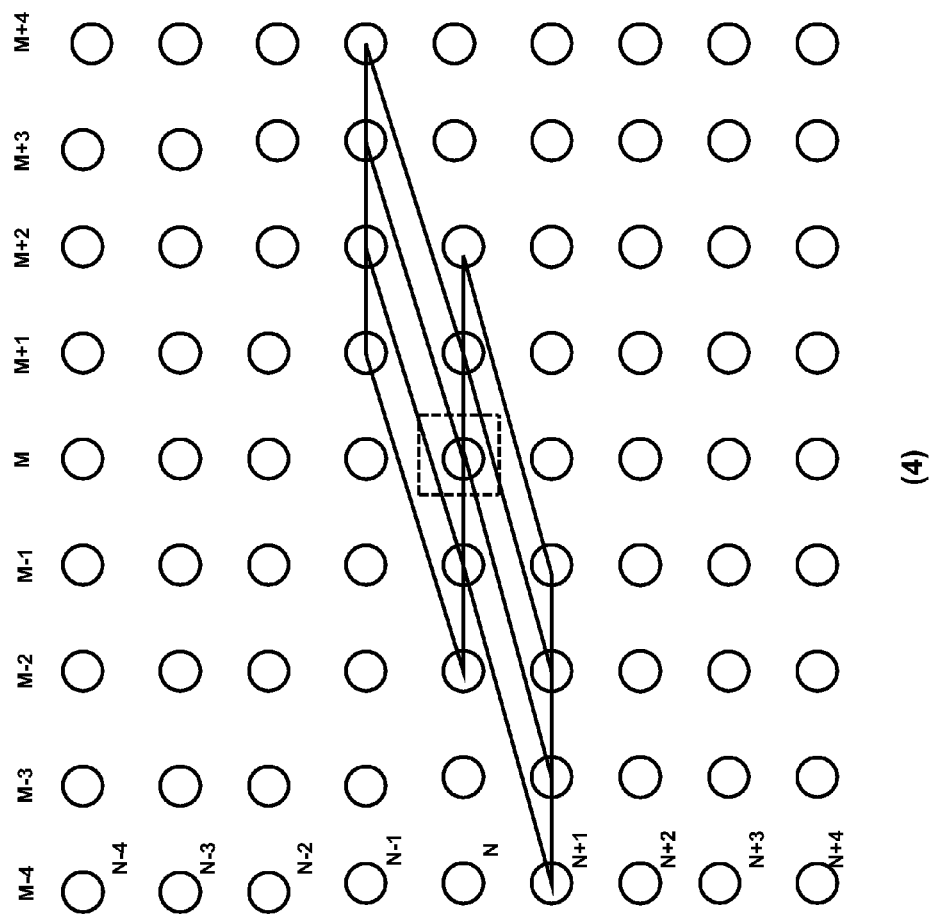
FIG. 8 illustrates an interpolation technique for +18.4 degrees.
Figure 9:
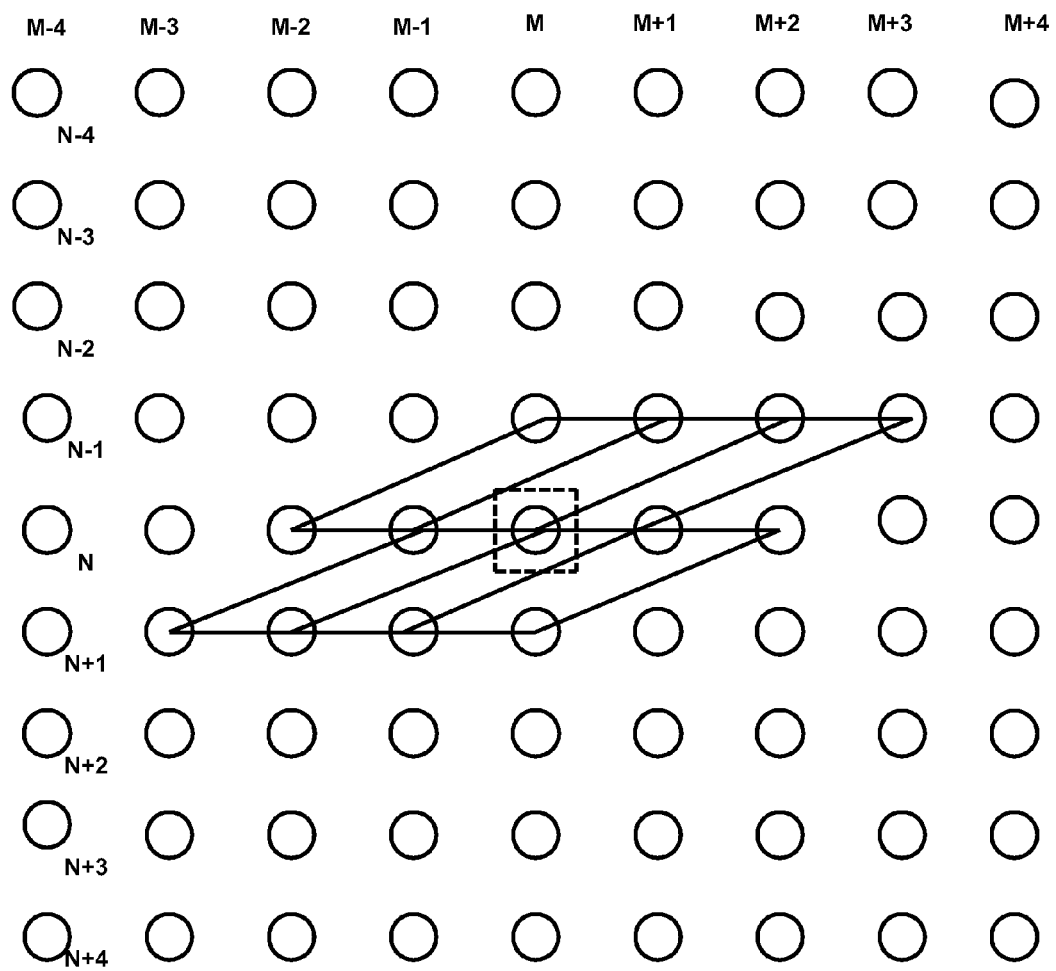
FIG. 9 illustrates an interpolation technique for +26.6 degrees.
Figure 10:
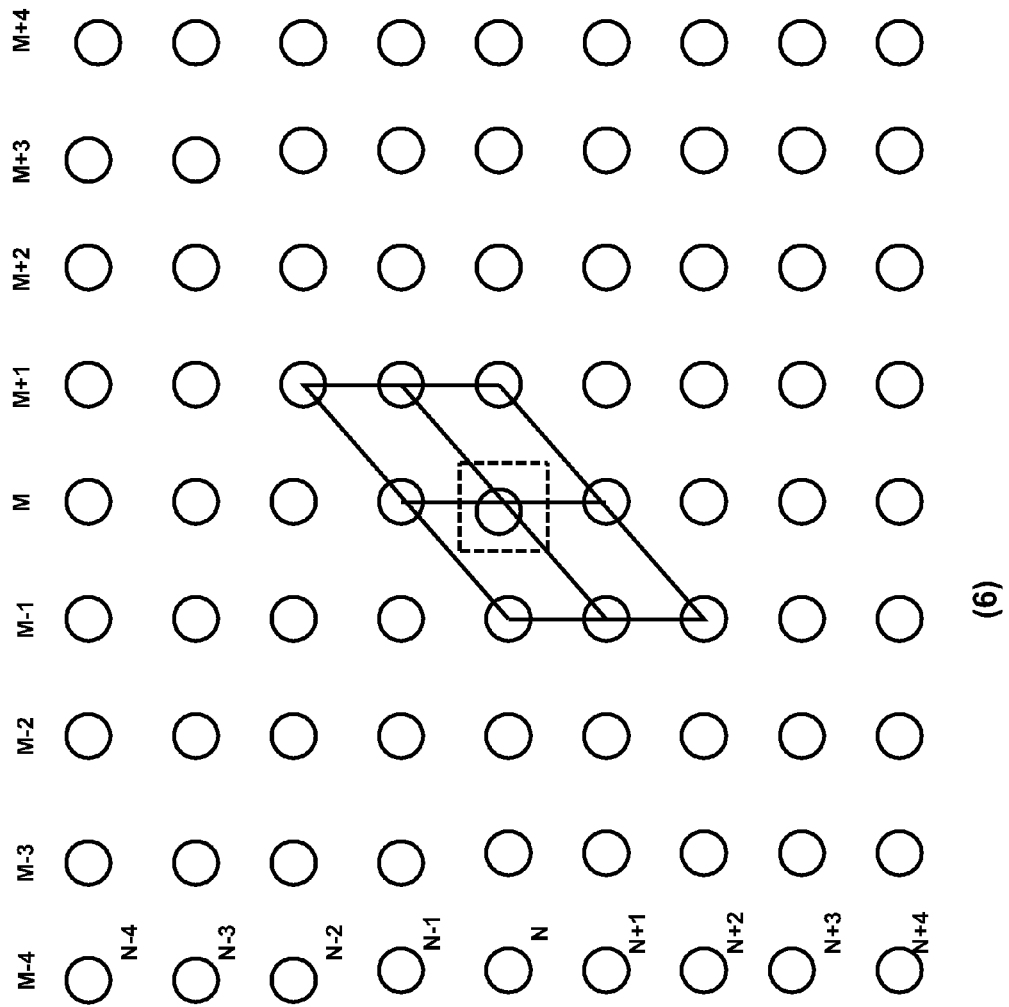
FIG. 10 illustrates an interpolation technique for +45 degrees.
Figure 11:
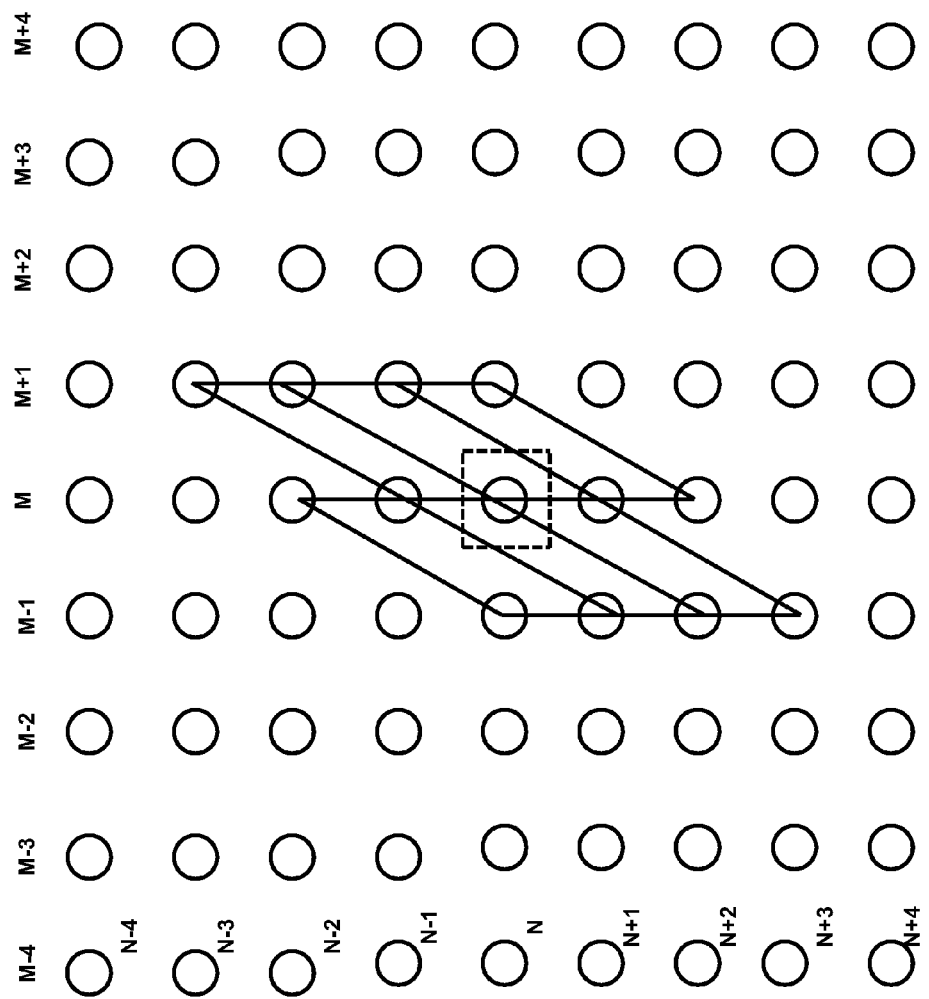
FIG. 11 illustrates an interpolation technique for +63.4 degrees.
Figure 12:
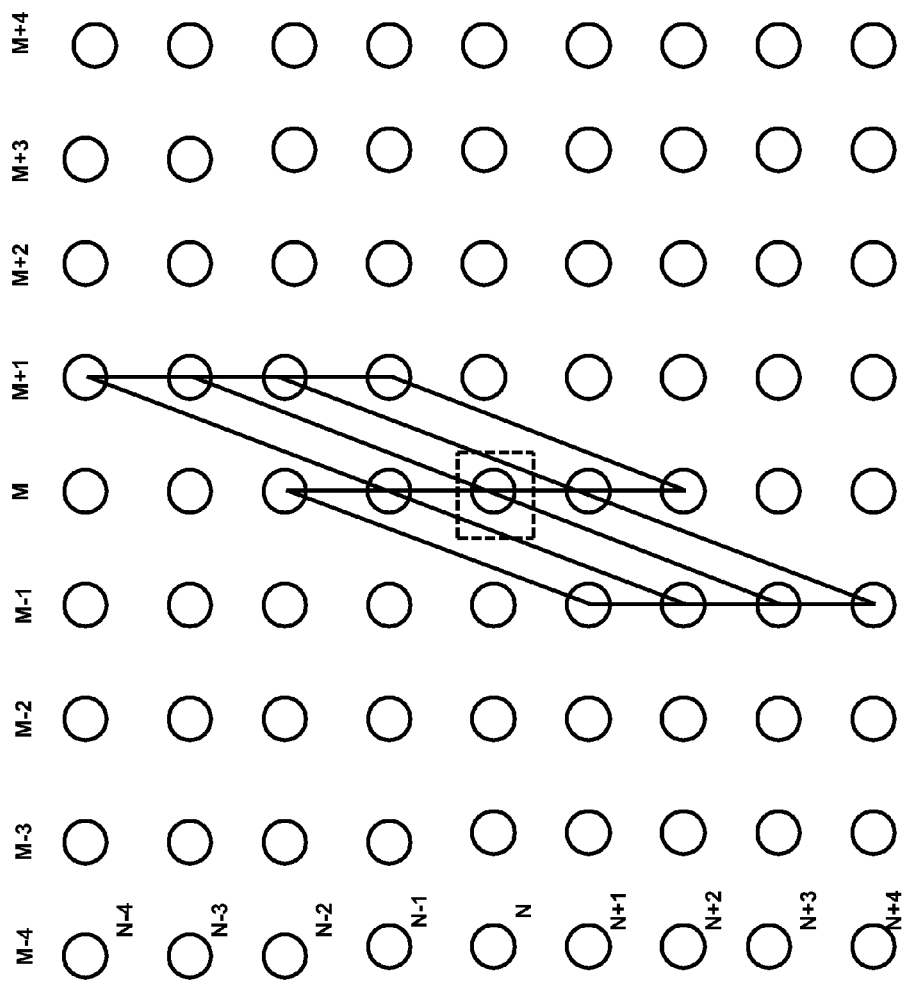
FIG. 12 illustrates an interpolation technique for +71.6 degrees.
Figure 13:
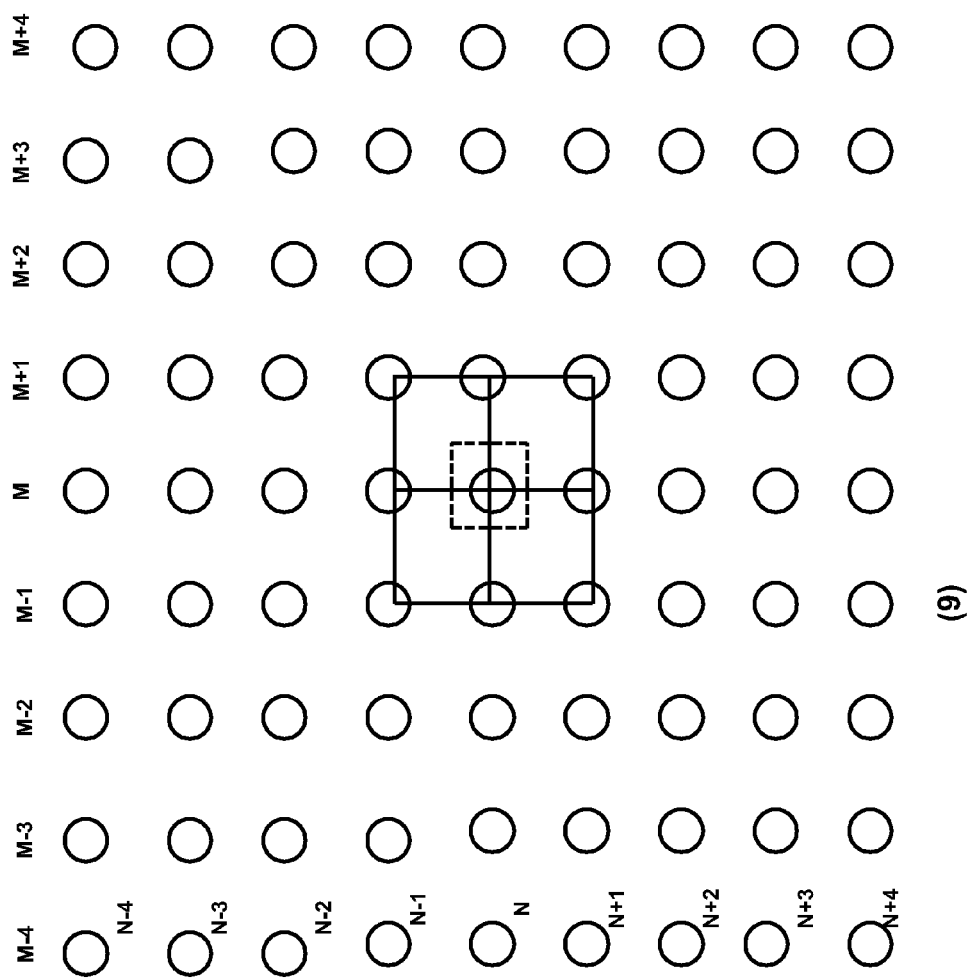
FIG. 13 illustrates an interpolation technique for +90 degrees.
Figure 14:
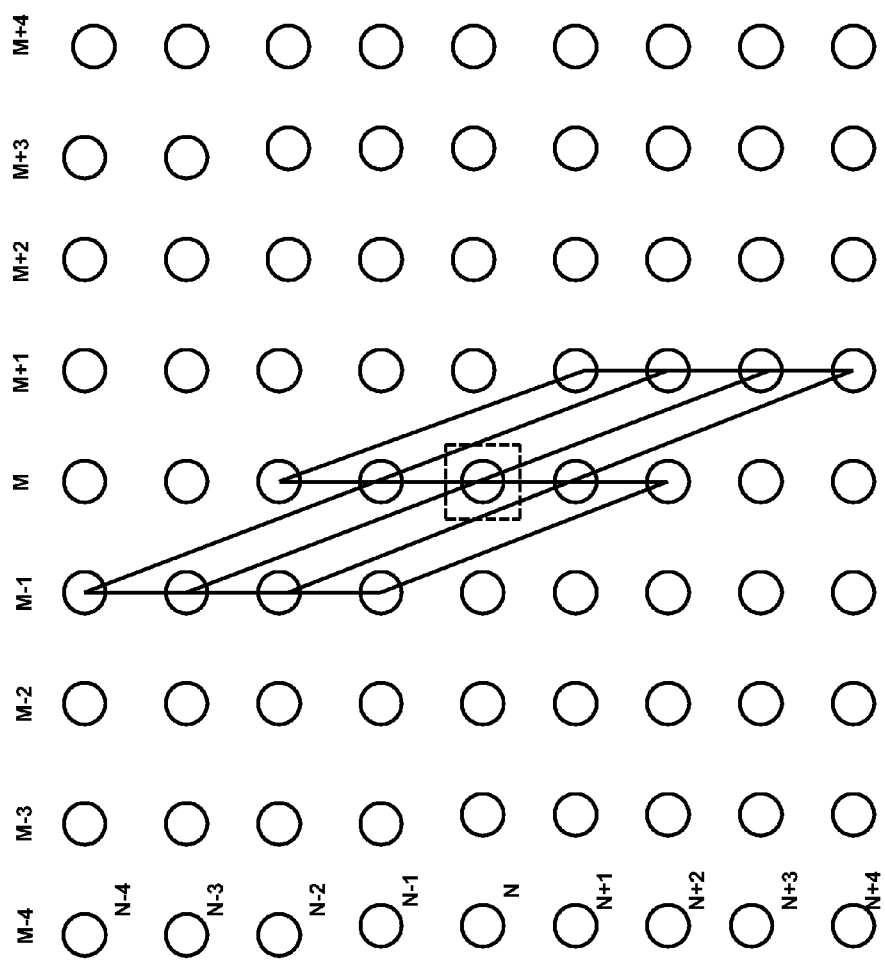
FIG. 14 illustrates an interpolation technique for +108.4 degrees.
Figure 15:
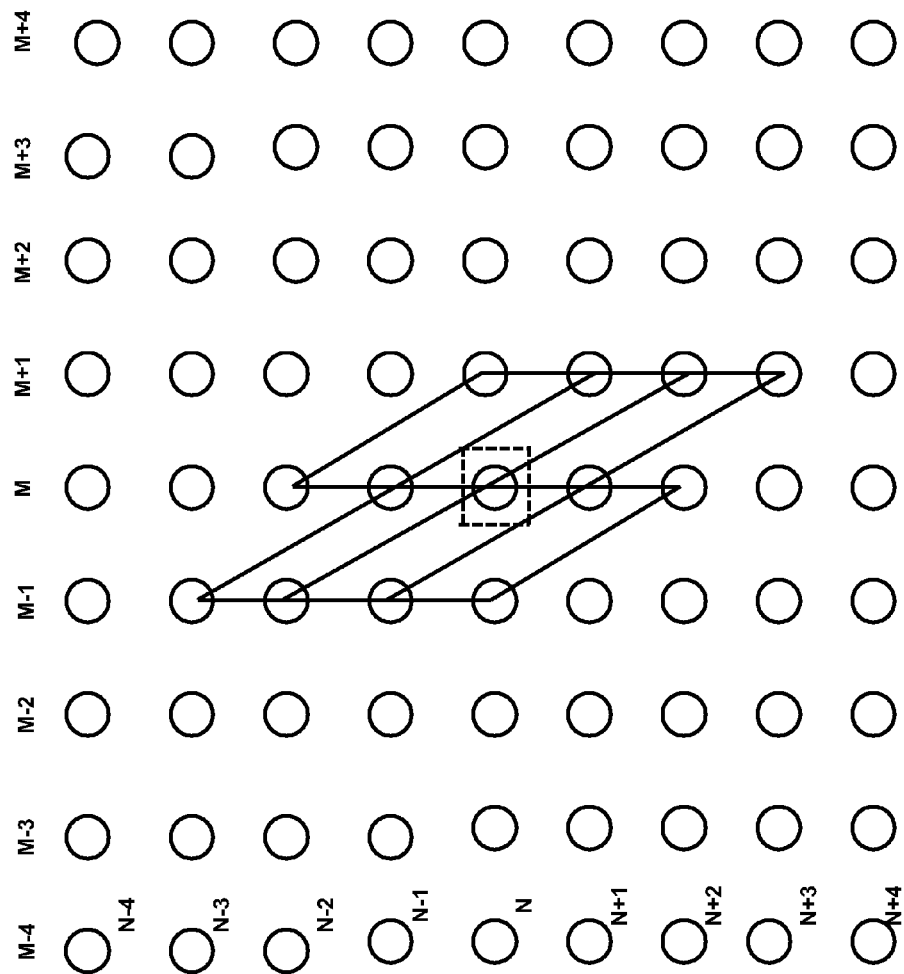
FIG. 15 illustrates an interpolation technique for +116.6 degrees.

The plurality of different directions may include, for example, 12 different directions defined as, −45 degrees (FIG. 4), −26.6 degrees (FIG. 5), −18.4 degrees (FIG. 6), 0 degrees (FIG. 7), +18.4 degrees (FIG. 8), +26.6 degrees (FIG. 9), +45 degrees (FIG. 10), +63.4 degrees (FIG. 11), +71.6 degrees (FIG. 12), +90 degrees (FIG. 13), +108.4 degrees (FIG. 14), and +116.6 degrees (FIG. 15). Each direction may be indexed with an index from 0 to 11, with direction with index 0 corresponding to −45 degrees, with index 1 corresponding to −26.6 degrees, with index 2 corresponding to −18.4 degrees, with index 3 corresponding to 0 degrees, with index 4 corresponding to +18.4 degrees, with index 5 corresponding to +26.6 degrees, with index 6 corresponding to +45 degrees, with index 7 corresponding to +63.4 degrees, with index 8 corresponding to +71.6 degrees, with index 9 corresponding to +90 degrees, with index 10 corresponding to +108.4 degrees, and with index 11 corresponding to +116.6 degrees. Along a direction, multiple parallelograms may be formed so that the new pixels are either inside the parallelograms or on the boundaries. The new pixels are interpolated using these parallelograms by averaging of pixels at either 4 corner points of a parallelogram, or by averaging pixels at 2 points in the 5 by 5 window. Other pixel selection techniques and calculation techniques may likewise be used.

As previously described, the directional interpolation process 180 includes three steps to determine the intensity value of a desired output position:

(1) determine the proper interpolation direction;
(2) determine the proper pixels to form a parallelogram for interpolation; and
(3) interpolating in the parallelogram along the interpolation direction.

Figure 3:
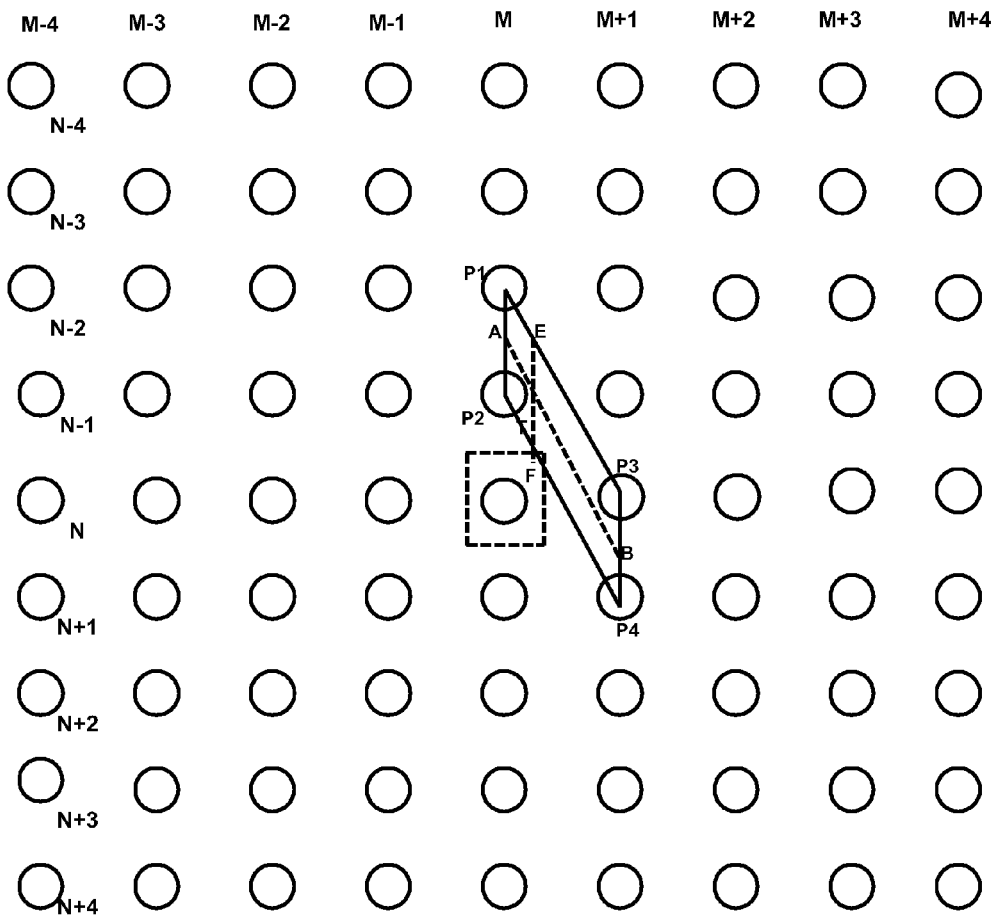
FIG. 3 illustrates direction interpolation.

With an arbitrary scaling factor previously described, the output pixels can be anywhere. As the first step, the directional interpolation module should determine the interpolation direction for any given output position. This may be simplified by using the edge orientation of the nearest input pixel estimated in the last phase as the interpolation direction. More specifically, for the position of T at (x,y), the nearest input pixel is at (M,N). Using math terms, $M = \text{round}(x)$ $N = \text{round}(y)$ All the output pixels in the ±0.5 range of (M,N) share the same interpolation direction. FIG. 3 illustrates an edge orientation at (M,N) with an edge orientation represented by angle index 11, so the interpolation direction is 116.6°.

In the second step, the direction interpolation module determines its 4 nearest pixels along the interpolation direction for any given output position. These 4 nearest input pixels form a parallelogram skewing along the interpolation direction. Illustrated in FIG. 3, output position T has an interpolation direction of 116.6°, so P1, P2, P3, and P4 are T's four nearest input pixels along this direction, and they form a parallelogram. Two sides of the parallelogram have the angle of 116.6°, the others are vertical. It is worthwhile to point out that although the input pixel at (M,N) determines T's interpolation direction, (M,N) might be outside of the interpolation parallelogram, as shown in FIG. 3.

FIGS. 4-15, as previously described, illustrate the interpolation parallelograms of all the 12 interpolation directions for all the output pixels in the ±0.5 range of (M,N). The parallelograms may have the following characteristics:

(1) the same interpolation position may be in different parallelograms if its interpolation direction changes;
(2) The output positions in the ±0.5 range of (M,N) share the same interpolation direction, but they may be interpolated in different parallelograms.

There are two sides of parallelograms:

(1) X-parallelograms are for angle indexes 0-5, whose top and bottom sides are parallel to the X-axis
(2) Y-parallelograms are for angle indexes 6-11, whose left and right sides are parallel to the Y-axis Different interpolation directions have different preferable window size requirement, and the preferred maximal window requirement is a 9×9 window at the input resolution.

Determining the 4 pixels P1 P2 P3 P4 along an interpolation direction for a given arbitrary output position T at (x,y) is illustrated in FIG. 16, which is different for both X- and Y-parallelograms. This technique is equally applicable for all other selection of multiple pixel values, such as those illustrated in FIGS. 4-15. Initially one may construct a triangle ABD in x- and y-parallelograms, respectively. Then calculate AC, the distance between A and C.

It may be observed that AC=AD*CT/BD. In x-parallelograms, AD is the same as the x-coordinate difference between P1 and P3; in y-parallelograms, AD is the same as the y-coordinate difference between P1 and P3. Specifically,

|    | 0 | 1 | 2 | 3 | 4  | 5  | 6  | 7  | 8  | 9 | 10 | 11 |
|----|---|---|---|---|----|----|----|----|----|---|----|----|
| AD | 1 | 2 | 3 | 0 | −3 | −2 | −1 | −2 | −3 | 0 | 3  | 2  |

In X-parallelograms, CT=y−floor(y); in Y-parallelograms, CT=x−floor(x). In both x- and y-parallelograms, BD=1. Therefore, $X\text{-parallelogram}: AC = AD*(y-\text{floor}(y))$ $Y\text{-parallelogram}: AC = AD*(x-\text{floor}(x))$ Calculate the coordinates of A,
X-parallelogram: C has the coordinate as (x, floor(y)). Then A has the coordinate as (x+AC, floor(y))
Y-parallelogram: C has the coordinate as (floor(x), y). Then A has the coordinate as (floor(x), y+AC).

From coordinates of A to determine coordinates of P1, P2, P3, P4

$X\text{-parallelogram}: P1 = (\text{floor}(x+AC), \text{floor}(y))$ $P2 = (\text{floor}(x+AC)+1, \text{floor}(y))$ $P3 = (\text{floor}(x+AC)+AD, \text{floor}(y)+1)$ $P4 = (\text{floor}(x+AC)+AD+1, \text{floor}(y)+1)$ $Y\text{-parallelogram}: P1 = (\text{floor}(x), \text{floor}(y+AC))$ $P2 = (\text{floor}(x), \text{floor}(y+AC)+1)$ $P3 = (\text{floor}(x)+1, \text{floor}(y+AC)+AD)$ $P4 = (\text{floor}(x)+1, \text{floor}(y+AC)+AD+1)$ In the third step, the directional interpolation technique interpolates the intensity value of T from intensity values of P1, P2, P3, and P4. To interpolate the pixel along the direction, as illustrated in FIG. 3, the system first define lines AB and EF that are parallel to P1P3 and P1P2 respectively. The cross point of AB and EF is T. Then the system may define the interpolation equation as:

$O_{DI}(x,y) = w_1 P_1 + w_2 P_2 + w_3 P_3 + w_4 P_4$ where $w_1, w_2, w_3, w_4$ are $w_1 = \text{area}_{TBFP4}$ $w_2 = \text{area}_{TBEP3}$ $w_3 = \text{area}_{TAFP2}$ $w_4 = \text{area}_{TAEP1} = 1 - w_1 - w_2 - w_3$ X- and Y-parallelograms are different in calculation of these weights:

X-parallelogram:

$w_1 = (1 - x - AC + \text{floor}(x + AC)) * (1 - y + \text{floor}(y))$ $w_2 = (x + AC - \text{floor}(x + AC)) * (1 - y + \text{floor}(y))$ $w_3 = (1 - x - AC + \text{floor}(x + AC)) * (y - \text{floor}(y))$ Y-parallelogram:

$w_1 = (1 - x + \text{floor}(x)) * (1 - y - AC + \text{floor}(y + AC))$ $w_2 = (1 - x + \text{floor}(x)) * (y + AC - \text{floor}(y + AC))$ $w_3 = (x - \text{floor}(x)) * (1 - y - AC + \text{floor}(y + AC))$ The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for interpolation comprising:
   (a) receiving an input image having a plurality of pixels;
   (b) estimating an edge direction proximate a first pixel of said input image using a first technique from a plurality of discrete potential directions;
   (c) interpolating pixels using a substantially arbitrary scaling factor proximate said first pixel based upon said estimated edge direction;
   (d) another interpolating pixels using substantially arbitrary scaling factor proximate said first pixel based upon another technique not based upon said estimated edge direction;
   (e) determining interpolated pixels for an output image having more pixels than said input image based upon said interpolated pixels of step (c) and step (d).

2. The method of claim 1 wherein said estimating is based upon a gradient.

3. The method of claim 1 wherein said estimating is based upon a 5 by 5 window.

4. The method of claim 1 wherein said estimating is performed upon a majority of said plurality of pixels of said image.

5. The method of claim 1 wherein said estimating is based upon the luminance of said image.

6. The method of claim 1 further comprising determining a reliability measure that said edge direction is suitable.

7. The method of claim 6 wherein said reliability measure is a weighted reliability measure.

8. The method of claim 1 wherein a plurality of said estimations are stored in a buffer.

9. The method of claim 8 wherein a selected one of said estimations closest to a desired output pixel for said interpolation is selected.

10. The method of claim 1 wherein said interpolation includes no iterations.

11. The method of claim 1 wherein said interpolation uses one of a plurality of pre-selected sets of pixels and weights.

12. The method of claim 11 wherein said interpolation uses a closest one of said estimations.

13. The method of claim 1 wherein said estimating of said edge direction is based on a plurality of pixels proximate said first pixel.

14. The method of claim 1 wherein said interpolating is based upon the pixels in a 9 by 9 window centered around said first pixel.

15. The method of claim 1 wherein said estimating and interpolating is based upon the pixels of different sized windows centered around said first pixel.

16. The method of claim 6 wherein said determining of said interpolated pixels is based on said reliability measure.

* * * * *